US012551911B2

(12) United States Patent
Savalle

(10) Patent No.: US 12,551,911 B2
(45) Date of Patent: Feb. 17, 2026

(54) DEVICE FOR DISPENSING A FLUID PRODUCT, AND METHOD FOR FILLING SAME

(71) Applicant: APTAR FRANCE SAS, Le Neubourg (FR)

(72) Inventor: Matthieu Savalle, Oissel (FR)

(73) Assignee: APTAR FRANCE SAS, Le Neubourg (FR)

( * ) Notice: Subject to any disclaimer, the term of this patent is extended or adjusted under 35 U.S.C. 154(b) by 987 days.

(21) Appl. No.: 17/766,804

(22) PCT Filed: Oct. 5, 2020

(86) PCT No.: PCT/FR2020/051738
§ 371 (c)(1),
(2) Date: Apr. 6, 2022

(87) PCT Pub. No.: WO2021/069823
PCT Pub. Date: Apr. 15, 2021

(65) Prior Publication Data

US 2024/0066537 A1 Feb. 29, 2024

(30) Foreign Application Priority Data

Oct. 7, 2019 (FR) ...................................... 1911085

(51) Int. Cl.
*B05B 11/02* (2023.01)
*B05B 11/00* (2023.01)
*B05B 11/04* (2006.01)

(52) U.S. Cl.
CPC .......... *B05B 11/02* (2013.01); *B05B 11/0054* (2013.01); *B05B 11/007* (2013.01); *B05B 11/04* (2013.01)

(58) Field of Classification Search
CPC ............... B05B 11/0054; B05B 11/007; B05B 11/02–029; B05B 11/04
See application file for complete search history.

(56) References Cited

U.S. PATENT DOCUMENTS 5,307,953 A * 5/1994 Regan .................... B05B 11/02 604/203
5,813,570 A * 9/1998 Fuchs ................ B05B 11/0027 604/203

(Continued)

FOREIGN PATENT DOCUMENTS

FR 2 750 051 A1 12/1997
WO 00/24523 A1 5/2000

(Continued)

OTHER PUBLICATIONS

International Search Report for PCT/FR2020/051738 dated Dec. 2, 2020 (PCT/ISA/210).

*Primary Examiner* — Valerie L Woodward
(74) *Attorney, Agent, or Firm* — Sughrue Mion, PLLC

(57) ABSTRACT

A device for dispensing a fluid product, including a body, a reservoir containing one or two doses of a fluid product, the reservoir including a plug which closes off the reservoir in a sealed manner before actuation, a dispensing head provided with a dispensing orifice, and dispensing mechanism for dispensing the fluid product through the dispensing orifice during actuation. The plug is symmetrical and reversible and has an internal portion elastically deformable and, when pressure is applied on one axial side of the plug or the other, deforms in order to open a passage and, when this pressure is released, returns elastically into its resting position in which it closes off the aforementioned passage.

8 Claims, 2 Drawing Sheets

(56) References Cited

U.S. PATENT DOCUMENTS

Figure 1:
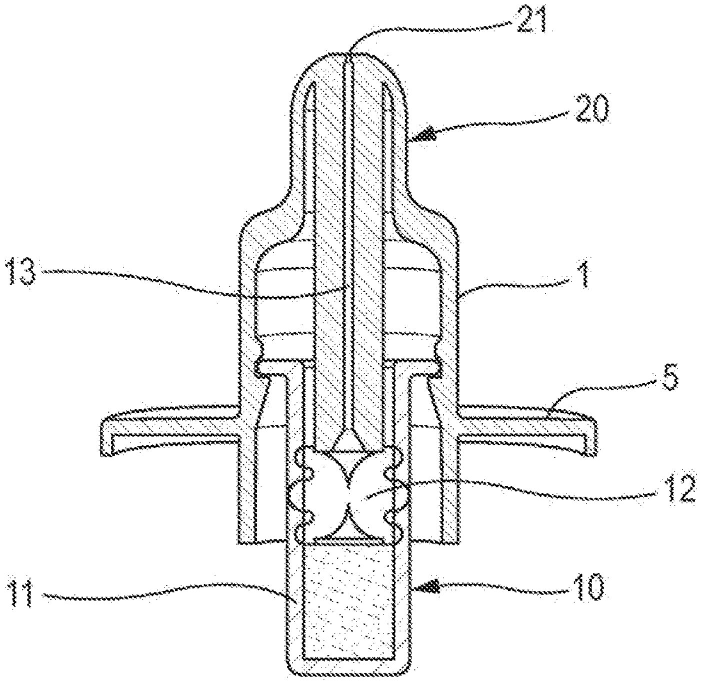

| | | | | |
|---|---|---|---|---|
| 6,450,216 | B1 * | 9/2002 | Stradella | B05B 11/02<br>604/203 |
| 2005/0029288 | A1 * | 2/2005 | Heldt | B05B 11/02<br>222/83 |
| 2017/0136477 | A1 * | 5/2017 | Heldt | A61M 15/0036 |

FOREIGN PATENT DOCUMENTS

| | | | |
|---|---|---|---|
| WO | 00/71262 | A1 | 11/2000 |
| WO | 2004/069664 | A2 | 8/2004 |

* cited by examiner

DEVICE FOR DISPENSING A FLUID PRODUCT, AND METHOD FOR FILLING SAME

CROSS REFERENCE TO RELATED APPLICATIONS

This application is a National Stage of International Application No. PCT/FR2020/051738 filed Oct. 5, 2020, claiming priority based on French Patent Application No. 1911085 filed Oct. 7, 2019.

The present invention relates to a device for dispensing fluid product and its filling method.

More particularly, the present invention relates to a fluid product dispensing device including a fluid product dispensing head for dispensing one or two doses of a pharmaceutical fluid product. In that type of device, generally referred to as a single-dose or two-dose device, each dose of fluid product, which is generally a liquid, is dispensed or sprayed through a dispensing orifice while the device is being actuated manually. If the device is a single-dose device, all of the fluid product is dispensed in a single actuation. If the device is a two-dose device, the fluid product is dispensed in two successive actuations of the device.

Generally, that type of single-dose or two-dose device is used for dispensing fluid product nasally, orally, or sublingually. For nasal dispensing, the dispensing head then includes an axial extension that is adapted to penetrate into user's nostril during use.

That type of device may present certain drawbacks. Thus, devices of the single-dose or two-dose type generally use a hollow needle, generally made of metal, to pierce the plug during actuation. However, the use of a metal part is expensive, and makes the recycling of the device after use more complex. In addition, when the plug is pierced by the needle, particles of elastomer can become detached from the plug and pollute the fluid dispensed.

Documents WO0024523, WO0071262, WO2004069664 and FR2750051 describe prior-art devices.

The purpose of this invention is to provide a fluid product dispensing device that does not have the abovementioned drawbacks.

More particularly, an object of the present invention is to provide a device which limits the risk of contaminating the fluid product before and during dispensing.

Another object of the present invention is to provide such a device that is simple and inexpensive to manufacture and to assemble.

The object of the present invention is therefore a device for dispensing fluid product, including a body, a reservoir containing one or two doses of a fluid product, said reservoir including a plug which closes off said reservoir in a sealed manner before actuation, a dispensing head provided with a dispensing orifice, and means for dispensing at least some of said fluid product through said dispensing orifice during actuation, said plug being symmetrical and reversible, said plug including an elastically deformable internal part which, when pressure is applied on one axial side of the plug or the other, deforms to open a passage, and which, when said pressure ceases, returns elastically into its rest position in which it closes off said passage.

Advantageously, said internal part includes two radially opposite convex parts biased at rest radially against each other to close said passage in a sealed manner.

Advantageously, said plug includes a recess in each convex part, to facilitate the elastic deformation of said convex parts.

Advantageously, said plug includes an external sealing part, formed on its external periphery.

Advantageously, said external sealing part includes at least one peripheral bead that provides sealing against an internal side wall of said reservoir.

The present invention also has the object of a method for filling a device for dispensing fluid product including a body, a reservoir containing one or two doses of a fluid product, said reservoir including a plug which closes off said reservoir in a sealed manner before actuation, a dispensing head provided with a dispensing orifice, and dispensing means to dispense at least some of said fluid product through said dispensing orifice during actuation, said plug being symmetrical and reversible, said plug including an elastically deformable internal part which, when pressure is applied on one axial side of the plug, deforms to open a passage, and which, when said pressure ceases, returns elastically into its rest position in which is closes off said passage, said method comprising the following steps:

- said plug is inserted into the bottom of said reservoir,
- a filling tube is inserted through said elastically deformable internal part of the plug,
- said reservoir is filled with said fluid product, said plug rising up in said reservoir under the effect of the hydraulic pressure of the fluid product,
- said filling tube is removed after filling, said internal part deforming elastically to close up said passage.

Advantageously, the filling continues at the start of removing said filling tube.

Figure 2:
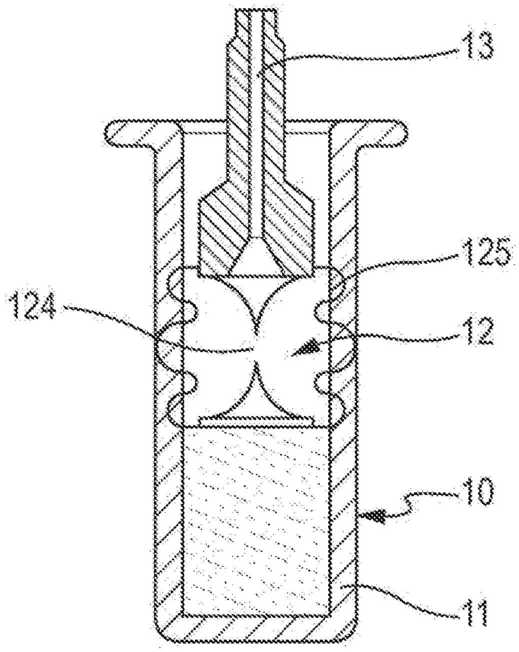
Figure 3:
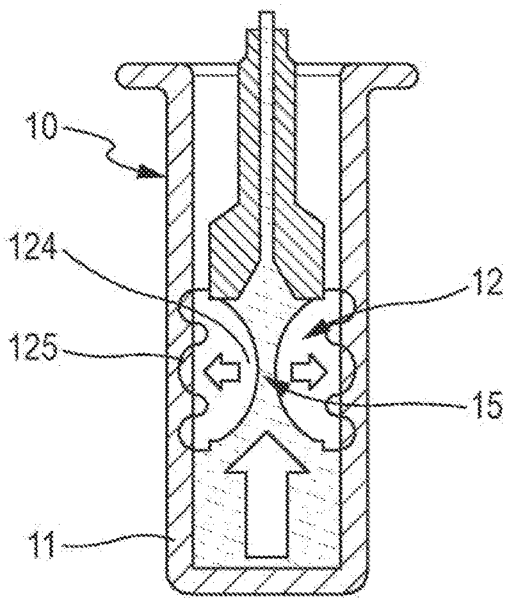

These and other characteristics and advantages of the present invention will appear more clearly from the following detailed description made with reference to the accompanying drawings, given by way of non-limiting examples, and in which:

FIG. 1 is a schematic cross-sectional view of a nasal fluid product dispensing device according to an advantageous embodiment, FIG. 2 is a schematic, detailed view of a part of the device of FIG. 1, before actuation, FIG. 3 is a view similar to the view in FIG. 2, during actuation, FIGS. 4 to 7 are schematic views showing the stages of filling the reservoir in FIGS. 1 to 3, and FIG. 8 is a schematic, transverse cross-sectional view of a plug according to an advantageous embodiment variant.

The terms "proximal" and "distal" are relative to the dispensing orifice. The terms "axial" and "radial" are relative to the longitudinal central axis of the device. The terms "upper", "lower", "top" and "bottom" are relative to the upright position of the device represented in FIGS. 1 to 7.

FIG. 1 shows an example of a nasal fluid product dispensing device to which the present invention applies. In this example, the device is a single-dose device in which all of the dose of fluid product is dispensed in a single actuation. It should be observed that the present invention could also be adapted to other types of device, e.g. such as devices of the two-dose type, containing two doses of fluid product to be dispensed in two successive actuations of the device.

The device includes a body 1 including a radial flange 5 on which the user's fingers bear during actuation.

A dispensing head 20, in this example of the nasal type, extends axially from said radial flange 5 and includes a dispensing orifice 21 that is oriented axially. The dispensing orifice 21 serves to dispense a dose of fluid product out from said dispensing head 20 while the device is being actuated by a user, such dispensing being performed by dispensing means.

Advantageously, the nasal dispensing head 20 is made integrally with said body 1. It should be observed that the present invention could also apply to a device including an oral dispensing head. More generally, the present invention applies to all types of single-dose or two-dose devices.

The body 1 accommodates a reservoir 10. Typically, as can be seen in the Figures, the reservoir 10 can be formed by a body that is hollow and blind 11, including a single opening that is closed by a plug 12 and containing a single dose of fluid product to be dispensed during a single actuation of the device. Naturally, in the context of a two-dose device, the reservoir 10 could contain two doses of fluid product to be dispensed in two successive actuations.

The plug 12 is made out of a deformable material, such as an elastomer.

The dispensing head 20 includes passage means 13 that, during actuation, connect the reservoir 10 to the dispensing orifice 21. These passage means advantageously include a hollow rod, preferably integral with the body 1, but which could also be made separately and assembled in said body 1. This hollow rod 13 opens on its proximal side into the dispensing orifice 21, and engages on its distal side with the plug 12 to move it relative to the reservoir 10 during actuation.

The plug 12 includes an external sealing part 125, formed on its external periphery. In the example in the Figures, this sealing part 125 includes three peripheral beads, an upper bead, a central bead and a lower bead, which provide sealing against the internal side wall of the reservoir 10. Naturally, any number of beads could be provided, for example a single bead.

According to the invention, the plug 12 includes an elastically deformable internal part 124 which, when pressure is applied on one axial side of the plug 12, deforms to open a passage 15, as can be seen in FIGS. 3, 5, 6 and 8. When the pressure ceases, the internal part returns elastically into its rest position, in which it closes off said passage 15. This makes it possible to guarantee the integrity of the fluid product before actuation, and also in the case of two doses, to guarantee the integrity of the fluid product between the two doses.

Advantageously, said internal part 124 can include two radially opposite convex parts 1241, 1242, biased at rest radially against each other to close said passage 15 in a sealed manner. The application of an axial pressure radially deforms these two convex parts away from each other, in order to open the passage. When the pressure ceases, the two convex parts return elastically into their closing-off rest position.

Advantageously, the plug 12 includes a recess 126 in each convex part 1241, 1242, to facilitate the elastic deformation of the convex parts. Such a plug can, in particular, be produced by additive printing.

As can be seen in the Figures, the plug 12 is perfectly symmetrical and can therefore be used equally well in one direction or the other. This reversible nature of the plug 12 is advantageous, in particular during assembly. Indeed, it is not necessary to orient the plug 12 in a particular direction, such that the assembly of the plug is simplified and therefore less expensive.

During actuation, the reservoir 10 is moved axially upwards relative to the body 1. During this movement, the plug 12 opens under the pressure of the fluid product which is incompressible, so as to open said passage 15, then the plug 12 slides into the reservoir 10 so as to expel the produce through said hollow rod 13. In this embodiment, the plug 12 forms the dispensing means.

In another embodiment that is not shown in the drawings, the reservoir need not be formed by a hollow and blind body that includes only one opening, but may be formed by a hollow cylinder that is open axially at both ends. This cylinder would thus be closed at the proximal end by a first plug according to the invention and at the distal end by a second standard plug, the volume defined between said two plugs containing the fluid product to be dispensed. When the user actuates the device, the user presses axially on the actuator body so as to slide it axially towards the dispensing orifice, as described above. This causes the second plug to move inside the reservoir. However, since the fluid product is incompressible, this movement of the second plug will therefore open the first plug and the contents of the reservoir will be dispensed through said first plug and said hollow rod by the second plug, which thus acts as a piston. In this embodiment, the second plug forms the dispensing means.

As described above, the invention could also apply to a device of the two-dose type. In that configuration, the contents of the reservoir would be dispensed in two successive actuations. Document WO 2014/147329 describes an example of a two-dose device.

FIGS. 4 to 7 show the successive steps of an advantageous filling method.

Figure 4:
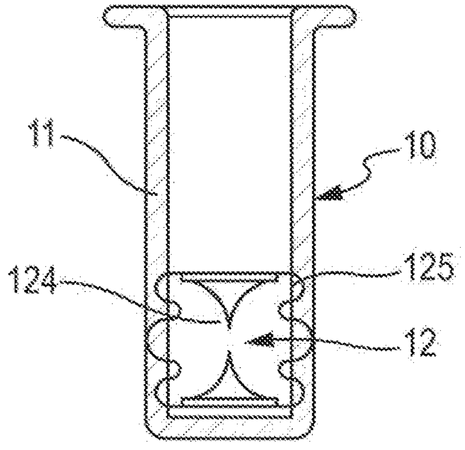

Preferably, the plug 12 is first inserted into the bottom of the reservoir 10, as can be seen in FIG. 4.

Figure 5:
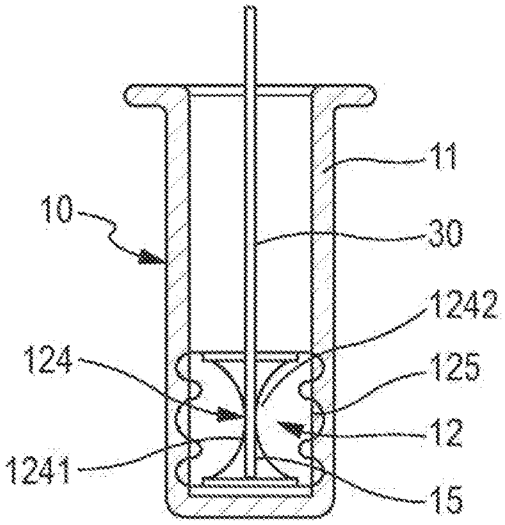
Figure 6:
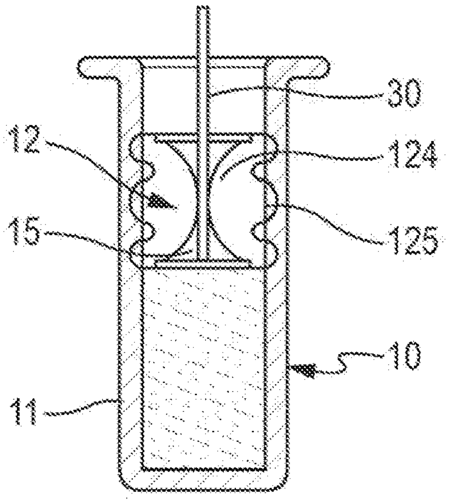
Figure 7:
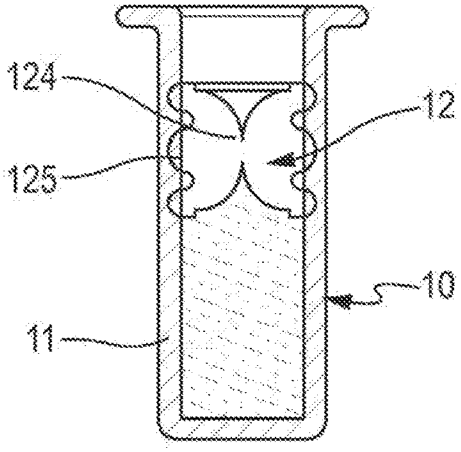
Figure 8:
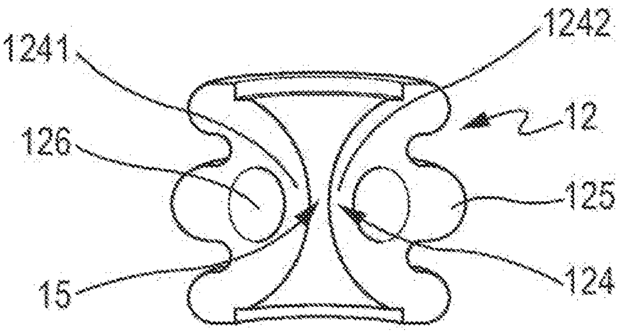

A filling tube 30 is thus inserted between the two convex parts 1241, 1242, as can be seen in FIG. 5, and the reservoir 10 is filled with said fluid product, as illustrated in FIG. 6. Under the effect of the hydraulic pressure of the fluid product, the plug 12 rises up in the reservoir 10.

The volume of the reservoir disposed behind the plug 12 can therefore be filled almost totally, except for the small volume occupied by the end of the filling tube 30. Advantageously, the filling continues at the start of the removal of the filling tube, until the tube reaches the contact point of the two convex parts, which makes it possible to remove the small dead volume connected to the tube.

When the filling tube 30 is completely removed after filling, the two convex parts 1241, 1242 deform elastically to close the passage 15.

Advantageously, this closure of the passage 15 removes any residual air that might remain at this place.

The present invention provides several advantages, and in particular:

- it improves the reproducibility of the spray, reducing variations from one reservoir to another;
- it avoids the use of a needle, removing the metal from the device and avoiding elastomer particles in the dispensed fluid;
- it makes it possible to avoid, or at least, to greatly limit oxidation of the fluid product on contact with air;
- it uses a symmetrical and reversible plug, which simplifies its design and assembly Naturally, other variant embodiments may also be envisaged, without going beyond the scope of the present invention, as defined by the accompanying claims.

The invention claimed is:

1. A device for dispensing fluid product, including a body, a reservoir containing one or two doses of a fluid product, said reservoir including a plug which closes off said reservoir in a sealed manner before actuation, a dispensing head provided with a dispensing orifice, and dispensing means to dispense at least some of said fluid product through said dispensing orifice during actuation, wherein said plug is symmetrical and reversible, said plug including an elastically deformable internal part which, when pressure is applied on an axial side of the plug or on the other, deforms to open a passage, and which, when said pressure ceases, returns elastically into a rest position, in which the plug closes off said passage.

2. The device according to claim 1, wherein said internal part includes two radially opposite convex parts biased at rest radially against each other to close said passage in a sealed manner.

3. The device according to claim 2, wherein said plug includes a recess in each convex part, to facilitate the elastic deformation of said convex parts.

4. The device according to claim 1, wherein said plug includes an external sealing part, formed on its external periphery.

5. The device according to claim 4, wherein said external sealing part includes at least one peripheral bead providing sealing against an internal side wall of said reservoir.

6. A method for filling a device for dispensing fluid product including a body, a reservoir containing one or two doses of a fluid product, said reservoir including a plug which closes off said reservoir in a sealed manner before actuation, a dispensing head provided with a dispensing orifice, and dispensing means to dispense at least some of said fluid product through said dispensing orifice during actuation, said plug being symmetrical and reversible, said plug including an elastically deformable internal part which, when pressure is applied on an axial side of the plug, deforms to open a passage, and which, when said pressure ceases, returns elastically into its rest position in which it closes off said passage, wherein said method comprises the following steps:

said plug is inserted into the bottom of said reservoir, a filling tube is inserted through said elastically deformable internal part of the plug, said reservoir is filled with said fluid product, said plug rising up in said reservoir under the effect of the hydraulic pressure of the fluid product, said filling tube is removed after filling, said internal part elastically deforming to close up said passage.

7. The method according to claim 6, wherein the filling continues at the start of the removal of said filling tube.

8. A device for dispensing fluid product, comprising:

a body;

a reservoir containing one or two doses of a fluid product, said reservoir including a plug that closes off said reservoir in a sealed manner before actuation; and a dispensing head provided with a dispensing orifice;

wherein said plug is symmetrical and reversible, said plug including two radially opposite and elastically deformable portions biased in a rest position radially against each other to close a passage from the reservoir to the dispensing orifice in a sealed manner;

wherein said two radially opposite and elastically deformable portions are configured to deform and separate to open the passage when pressure is applied on at least one axial side of the plug; and wherein, when said pressure ceases, said two radially opposite and elastically deformable portions are configured to return to the rest position closing off said passage.

* * * * *